(12) United States Patent
Locke et al.

(10) Patent No.: US 10,988,390 B2
(45) Date of Patent: Apr. 27, 2021

(54) GAS/LIQUID PLASMA REACTOR WITH PULSED POWER SUPPLY AND SECONDARY DIRECT CURRENT ELECTRODES

(71) Applicant: Florida State University Research Foundation, Inc., Tallahassee, FL (US)

(72) Inventors: Bruce R. Locke, Tallahassee, FL (US); Robert J. Wandell, Tallahassee, FL (US); Youneng Tang, Tallahassee, FL (US)

(73) Assignee: FLORIDA STATE UNIVERSITY RESEARCH FOUNDATION, INC., Tallahassee, FL (US)

( * ) Notice: Subject to any disclaimer, the term of this patent is extended or adjusted under 35 U.S.C. 154(b) by 97 days.

(21) Appl. No.: 16/514,704

(22) Filed: Jul. 17, 2019

(65) Prior Publication Data

US 2020/0102231 A1 Apr. 2, 2020

Related U.S. Application Data

(60) Provisional application No. 62/738,358, filed on Sep. 28, 2018.

(51) Int. Cl.
| | |
|---|---|
| *C02F 1/46* | (2006.01) |
| *C02F 1/70* | (2006.01) |
| *H05H 1/48* | (2006.01) |
| *C02F 101/36* | (2006.01) |
| *C02F 103/06* | (2006.01) |

(52) U.S. Cl.
CPC .............. *C02F 1/4608* (2013.01); *C02F 1/70* (2013.01); *H05H 1/48* (2013.01); *C02F 2101/36* (2013.01); *C02F 2103/06* (2013.01); *C02F 2201/46* (2013.01)

(58) Field of Classification Search
CPC .. C02F 1/46; C02F 1/4608; C02F 1/70; C02F 2101/36; C02F 2103/06; C02F 2202/46; H05H 1/48
USPC ......................................................... 588/311
See application file for complete search history.

(56) References Cited

U.S. PATENT DOCUMENTS 9,861,950 B2 1/2018 Locke et al.
10,350,572 B2 7/2019 Locke et al.

*Primary Examiner* — Edward M Johnson
(74) *Attorney, Agent, or Firm* — Fox Rothschild LLP

(57) ABSTRACT

A reactor system for reacting liquid phase chemical species in a liquid includes a reactor vessel for containing the liquid phase and a gas phase. The reactor vessel can have a gas injection port, a gas exit port, and a liquid-gas interface location within the reactor vessel. A pulsed discharge cathode and anode are provided for creating a pulsed discharge electric field at the liquid-gas interface location. A pulsed discharge power supply delivers a pulsed power input to the pulsed discharge cathode and anode, and thereby creates a plasma comprising ions at the liquid-gas interface location. A secondary electric field source is provided for directing a secondary electric field transverse to the liquid-gas interface. The secondary electric field will drive some of the ions from the gas phase into the liquid phase to react with the liquid phase chemical species. A method for reacting a liquid phase chemical species is also disclosed.

20 Claims, 4 Drawing Sheets

GAS/LIQUID PLASMA REACTOR WITH PULSED POWER SUPPLY AND SECONDARY DIRECT CURRENT ELECTRODES

CROSS-REFERENCE TO RELATED APPLICATIONS

This application claims priority to U.S. Provisional Patent Application No. 62/738,358 filed Sep. 28, 2018, entitled Gas/Liquid Plasma Reactor With Pulsed Power Supply and Secondary Direct Current Electrodes," the entirety of which is incorporated herein by reference.

STATEMENT REGARDING FEDERALLY SPONSORED RESEARCH AND DEVELOPMENT

This invention was made with government support under Contract No. CBET1702166 awarded by the National Science Foundation. The government has certain rights in this invention.

FIELD OF THE INVENTION

The present invention relates generally to plasma reactors, and more particularly to plasma reactors for reacting liquid, gas, and/or liquid-gas interfacial chemical species.

BACKGROUND OF THE INVENTION

Per- and poly-fluoroalkyl substances (PFAS) are a group of approximately 5,000 human-derived chemicals that are used in consumer products such as cookware, food packaging, and carpets, and in industrial applications such as fire-fighting foam, food processing, and electronics manufacturing. Many consumer goods containing or pretreated with PFAS are eventually disposed of at municipal solid waste (MSW) landfills. Some discarded PFAS-containing products (e.g., carpeting) may be sent to industrial RCRA (Resource Conservation and Recovery Act) non-hazardous or construction and demolition landfills. Due to the strong carbon-fluorine (F—C) bonds PFAS do not degrade like other waste components, and thereby appear in the landfill leachate. Most modern landfills are designed with leachate collection systems to collect leachate for treatment and engineered barrier (liners) to prevent leachate from contaminating the groundwater.

According to a recent study by the Environmental Research & Education Foundation, the majority (~62%) of landfills send the collected leachate to wastewater treatment plants (WWTPs) via sewers or trucks, a small portion of the landfills (~6%) fully treat the leachate on site, and other landfills (~32%) dispose of the leachate through other methods such as deep well injection and leachate recirculation. Sending leachate to WWTPs without pretreatment has been preferred for its easy maintenance and low operating costs. However, WWTP managers are becoming reluctant to accept non-pretreated leachate due to the increasingly stringent regulations on wastewater discharge. Therefore, the need for leachate pretreatment prior to releasing to WWTPs will likely increase in the future.

The PFAS' persistence, combined with their mobility and potential hazards to human, presents serious leachate treatment and disposal challenges. The United States Environmental Protection Agency (USEPA) has established the health advisory levels at 70 parts per trillion for two commonly found PFAS: perfluorooctanoic acid (PFOA) and perfluorooctane sulfonic acid (PFOS), and initiated the steps to evaluate the need for an Maximum Contaminant Level. It is desirable to remove PFAS in landfills rather than in WWTPs or drinking water treatment plants (DWTPs) since the volume of water to be treated in the WWTPs and DWTPs is much larger than the volume of the landfill leachate and the PFAS concentrations in the WWTPs and DWTPs are lower than that in the leachate due to dilution.

Due to the strong C—F bond and low concentrations, PFAS are very difficult to degrade and to remove from water. Treatment technologies that have been demonstrated to be effective for their removal from drinking water include activated carbon, membrane filtration, anion exchange, and some advanced oxidation/reduction processes. Of the various advanced oxidation/reduction methods for PFOA (a model PFAS) degradation the highest energy yields, as shown in Table 1, are for non-thermal plasma in and over water, UV-activated persulfate, gramma radiation, and electron beams. Sonolysis, electrochemical, and UV photo reactors have the lowest efficiencies.

TABLE 1

Methods for PFOA (a model PFAS) Degradation

| Treatment | $[PFOA]_0$ ($\mu$M) | Energy yield ($10^{-11}$ · mol/J) | Main reactants |
|---|---|---|---|
| Plasma, in and over water | 20 | 45 to 140 | $e^-_{aq}$, $Ar^+$, $^-OH$ |
| Sonolysis | 20 | 2.4 | Pyrolysis, •OH |
| UV-activated persulfate | 50 | 43 | UV, $SO_4^{\bullet-}$ |
| Electrochemical treatment | 0.031 | 0.059 | Electron transfer at electrode |
| DC plasma in $O_2$ bubbles | 100 | 3.3 | oxygen ions |
| Gamma radiation | 50 | 96 (pH 13) | •OH, $e^-_{aq}$ |
| UV photo reactor | 35 | 0.05 | Photogenerated $e^-_{aq}$ |
| Electron beam | 1.3 | 21 | $e^-_{aq}$ |

Plasma is an overall electrically neutral ionized gas that contains ions, radicals, and free electrons, and that is typically formed by high voltage electrical discharge. The specific reactive species generated in plasma depends upon the gas composition as well as the plasma properties (e.g., electron energy, electron density, plasma temperature) and electrode configurations and reactor design. Plasma processes have been widely used and commercialized for gas phase pollution treatment and ozone formation. There is a growing interest in plasma contacting liquid water for applications in environmental, chemical, biochemical, biomedical, and materials engineering. When plasma is formed in an atmosphere of a noble gas such as argon or helium, or with additional oxygen, in contact with liquid water, the major reactive species formed are $H_2O_2$, .OH, .H, various molecular, atomic and radical oxygen species (e.g., $O(^1D)$, $O_3$), and some ionic species, including, of major significance, the reducing species aqueous electrons ($e_{aq}^-$). These species react with the target compounds in the liquid, gas, and at the gas-liquid interface and may lead to partial degradation or complete mineralization. While most of the highly reactive species are consumed within or near the gas-liquid interface, other more stable compounds may transfer deeper into the bulk liquid where they may react further. An examples of such a plasma based system can be found U.S. Pat. No. 9,861,950 to Locke et al, the disclosure of which is fully incorporated by reference.

Aqueous electrons, $e^-_{aq}$, have been shown to be formed in such plasma reactors and it has been demonstrated that $e^-_{aq}$, a key chemically reducing species, is responsible for the degradation of PFOA when plasma is formed directly inside water with a negative electrode polarity discharge. When argon gas is sprayed through the electrode needle or gas bubbles are combined with a plasma discharge, then the combination of both $e^-_{aq}$, hydroxyl radicals and gas phase ions (putatavely positive argon ions) are responsible for the PFOA degradation. Typically the energy efficiency of plasma over a liquid surface is much higher than plasma generated directly inside the liquid. As shown in Table 1, energy yields are over 3.2 times better in these gas-liquid plasma reactors than in other advanced oxidation/reduction processes such as the UV-activated sulfate reactor. PFOA and PFOS degradation with direct current (DC) plasma discharges containing oxygen bubbles was suggested to occur through oxygen positive ion reactions. Gamma radiation is only highly efficient at very high, and impractical pH (13), and performance drops dramatically with lower pH.

SUMMARY OF THE INVENTION

A reactor system for reacting liquid phase chemical species in a liquid includes a reactor vessel for containing the liquid phase and a gas phase, and having a liquid-gas interface location within the reactor vessel. A pulsed discharge cathode and anode are provided for creating a pulsed discharge electric field at the liquid-gas interface location. A pulsed discharge power supply delivers a pulsed power input to the pulsed discharge cathode and anode, and thereby creates a plasma comprising ions at the liquid-gas interface location. A secondary electric field source directs a secondary electric field transverse to the liquid-gas interface. The secondary electric field will drive some of the ions from the gas phase into the liquid phase to react with the liquid phase chemical species. The ions can include negative ions, and the negative ions can include electrons. The secondary electric field source can include a direct current cathode and anode.

A method for reacting a liquid phase chemical species, can include the steps of providing liquid phase containing the liquid phase species, providing a gas phase, and providing a reactor vessel for containing the liquid phase and the gas phase. The liquid and the gas are placed in the reactor vessel so as to form a liquid-gas interface between the liquid phase and the gas phase within the reactor vessel. A pulsed discharge cathode and anode are provided for creating a pulsed discharge electric field at the liquid-gas interface. A pulsed power input is provided to the pulsed discharge cathode and anode, and thereby creates a plasma comprising ions at the liquid-gas interface. A secondary electric field is directed transverse to the liquid-gas interface, wherein the secondary electric field will drive some of the ions from the gas phase into the liquid phase to react with the liquid phase species.

The method can further include injecting gas bubbles into the liquid phase, wherein the bubbles will transport the liquid phase chemical species to the plasma at the liquid-gas interface. The gas can be ozone, wherein the ozone will react with the liquid phase chemical species as the liquid phase chemical species is transported to the liquid-gas interface. The method can also include the step of recirculating at least one selected from the group consisting of the liquid phase and the gas phase to the reactor vessel.

BRIEF DESCRIPTION OF THE DRAWINGS

There are shown in the drawings embodiments that are presently preferred it being understood that the invention is not limited to the arrangements and instrumentalities shown, wherein.

DETAILED DESCRIPTION OF THE INVENTION

Figure 1:
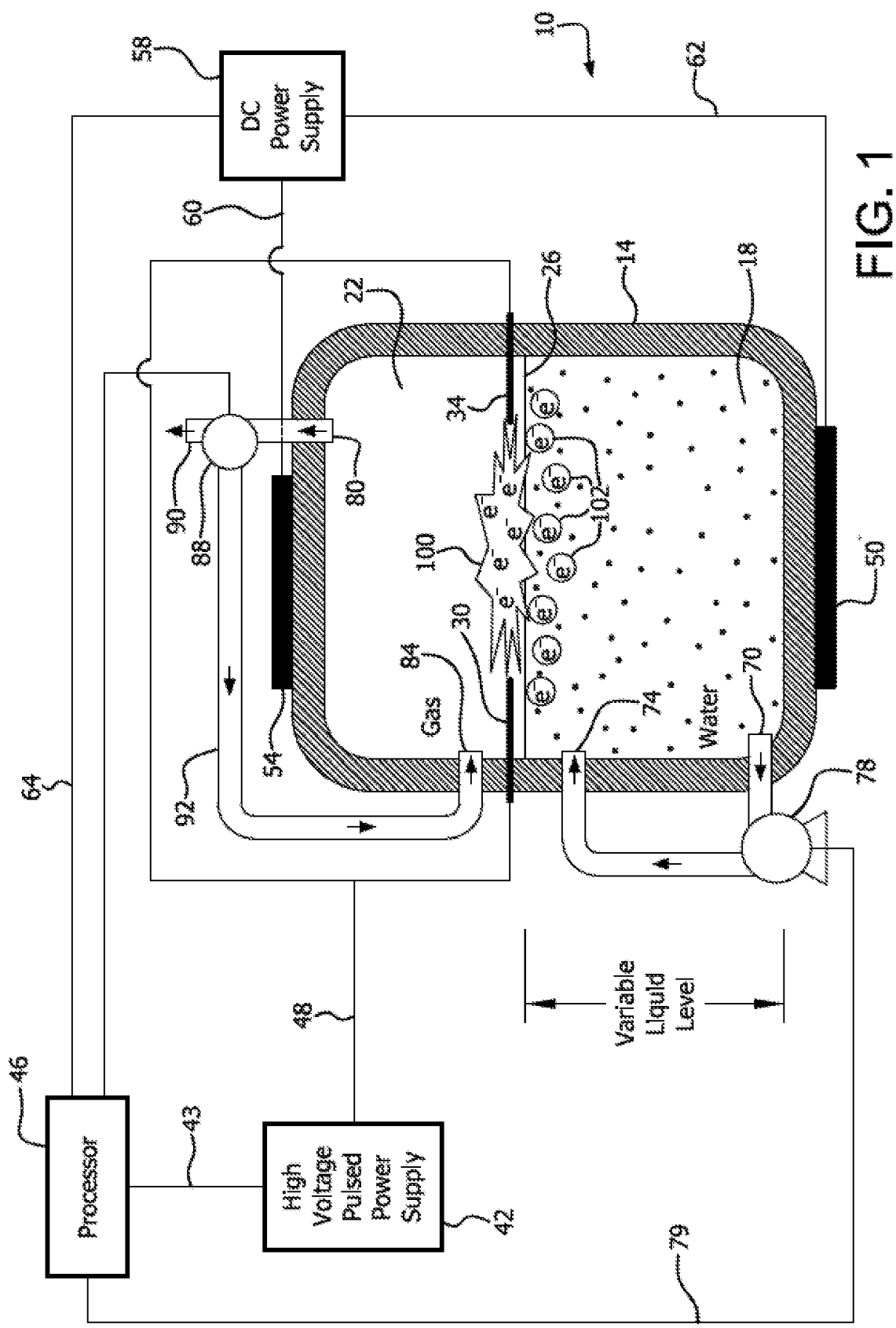
FIG. 1 is a schematic representation of a reactor system for reacting liquid phase chemical species.

A reactor system for reacting liquid phase chemical species in a liquid includes a reactor vessel for containing the liquid phase and a gas phase. The reactor vessel can have a gas injection port, a gas exit port, and a liquid-gas interface location within the reactor vessel. A pulsed discharge cathode and anode are provided for creating a pulsed discharge electric field at the liquid-gas interface location. A pulsed discharge power supply delivers a pulsed power input to the pulsed discharge cathode and anode, and thereby creates a plasma comprising ions at the liquid-gas interface location. A secondary electric field source is provided for directing a secondary electric field transverse to the liquid-gas interface. The secondary electric field will drive some of the ions from the gas phase into the liquid phase to react with the liquid phase chemical species.

The ions that are created in the plasma will be a function of the gas that it subjected to the pulsed discharge electric field. Many different ions are possible, including both positive and negative ions. The negative ions can be electrons, which when present in the liquid become highly reactive aqueous electrons. The gas phase can include at least one selected from the group consisting of nitrogen, oxygen, air, ozone, argon, and helium.

The liquid phase can include water. The water can contain a variety of different solutes and contaminants. The water can, for example, be waste water, landfill leachate, or ground water.

The pulsed electric field can be generally directed parallel to the liquid gas interface, in order that the plasma is formed along and close to the liquid-gas interface. The electrode position and angle relative to the liquid-gas interface surface should be such that the pulsed electric field travels along the liquid-gas interface. The orientation can vary, and the gap distance between the electrodes can vary. The gap distance between the pulsed electric field electrodes can in one embodiment be between 1-10 mm. The gap distance between the secondary electrodes can also vary, and in one embodiment can be between 1 and 10 cm.

The plasma discharge can have a frequency of from 100 Hz to 1 MHz. The plasma discharge frequency can be 100, 250, 500, 750, 1000, 2500, 5000, 7500, 10000, 25000, 50000, 75000, 100000, 250000, 500000, 750000 or 1000000 Hz, or can be within a range of any high value and low value selected from these values.

The field strength of the secondary electric field can vary. The secondary electric field strength can be from 10 to 1000 V/cm. The secondary electric field strength can be 10, 20, 30, 40, 50, 60, 70, 80, 90, 100, 110, 120, 130, 140, 150, 160, 170, 180, 190, 200, 210, 220, 230, 240, 250, 260, 270, 280, 290, 300, 310, 320, 330, 340, 350, 360, 370, 380, 390, 400, 410, 420, 430, 440, 450, 460, 470, 480, 490, 500, 510, 520, 530, 540, 550, 560, 570, 580, 590, 600, 610, 620, 630, 640, 650, 660, 670, 680, 690, 700, 710, 720, 730, 740, 750, 760, 770, 780, 790, 800, 810, 820, 830, 840, 850, 860, 870, 880, 890, 900, 910, 920, 930, 940, 950, 960, 970, 980, 990, and 1000 V/cm, or can be within a range of any high value and low value selected from these values.

The secondary electric field is generally transverse to the liquid-gas interface such that plasma ions and particularly electrons if present are driven from the plasma into the liquid. The secondary electric field can be perpendicular to the liquid-gas interface, or can be offset from the liquid-gas interface.

The invention can be used to react many different liquid phase chemical species. The at least one chemical species can be a compound subject to chemical reduction. The at least one chemical species can be a fluorinated organic compound. The fluorinated organic compound can be a per- or poly-fluoroalkyl organic compound.

The reactor system can include a gas injection port and a gas exit port. The reactor system can include a liquid injection port and a liquid exit port. The reactor system can include a recirculation conduit and a recirculation pump for recirculating at least one selected from the group consisting of the liquid phase and the gas phase from the reactor vessel. Recirculation can improve the conversion efficiency of the liquid phase chemical species and can conserve compounds from both the liquid and the gas phase.

The position of the pulsed discharge cathode and anode can vary. The pulsed discharge cathode and anode can be inside or outside the reactor vessel. The secondary electric field source can include a direct current cathode and anode. Other secondary electric field sources are possible. The direct current cathode and anode can be inside or outside the reactor vessel. If the secondary electric field cathode and anode are inside the reactor vessel, they can be made porous, as by forming them from a mesh or with through-passages, to permit fluid flow there through which might otherwise be exhausted from the system.

The gas injection port can be provided in different locations in the reactor vessel. The gas injection port can be configured to inject gas into the gas phase side of the liquid-gas interface. Alternatively, or in addition, gas injection can occur into the liquid. In one embodiment, a gas injection port can be configured to distribute gas bubbles into the liquid phase. Gas bubbles moving through the liquid will gather and transport some of the liquid phase chemical species to the plasma at the gas liquid interface location. Examples of such chemical species are chemical species with surfactant properties which will be attracted to the bubble-water interface, and volatile chemical species which can enter the gas phase of the bubble. As the bubbles rise, the liquid phase chemical species can accumulate at the bubble surface and will be transported with the bubble to the liquid-gas liquid interface, where there is a higher density of gas phase ions and aqueous ions such as aqueous electrons.

The reactor system can include a reactive gas source, wherein ozone bubbles or bubbles of another gas that is reactive or contains a compound that is reactive with the liquid phase chemical species will be introduced into the liquid phase to react with the liquid phase chemical species. These bubbles of reactive gas can be introduced substantially below the liquid-gas interface, such as at or near the bottom of the vessel, and will thereby rise through the liquid phase toward the liquid-gas interface. The reactive gas bubbles will react with the chemical species as the bubbles rise, such that some reaction of the chemical species will occur before the chemical species reaches the plasma ions or aqueous electrons. The bubbles can also collect and carry some of the liquid phase chemical species to the liquid-gas interface as the bubbles rise. This can result in a more thorough conversion of the liquid phase chemical species.

A method for reacting a liquid phase chemical species, includes the step of providing a liquid phase containing the liquid phase species, providing a gas phase, and providing a reactor vessel for containing the liquid phase and the gas phase. The liquid and the gas are placed in the reactor vessel so as to form a liquid-gas interface between the liquid phase and the gas phase within the reactor vessel. A pulsed discharge cathode and anode are provided for creating a pulsed discharge electric field at the liquid-gas interface. A pulsed power input is provided to the pulsed discharge cathode and anode, and thereby creates a plasma comprising ions at the liquid-gas interface. A secondary electric field is directed transverse, for example perpendicular, to the liquid-gas interface, wherein the secondary electric field will drive some of the ions from the gas phase into the liquid phase to react with the liquid phase species.

FIG. 1 is a schematic representation of a reactor system 10 for reacting liquid phase chemical species. The reactor system 10 includes a reactor vessel 14, which can contain a liquid 18 and gas 22, defining a liquid-gas interface 26. A pulse discharge cathode 30 and anode 34 can be positioned within the vessel 14 for creating a pulsed discharge electric field at the liquid-gas interface location, and can be positioned such that the pulsed discharge electric field is directed parallel to the liquid-gas interface, although other orientations are possible. A pulsed discharge power supply 42 is provided for delivering a pulsed power input through line 48 to the pulsed discharge cathode 30 and anode 34, thereby creating a plasma 100 comprising ions at the liquid-gas interface location 26. A processor 46 can be provided to control operation of the high-voltage pulsed power supply 42 through a wired or wireless communications line 43.

A secondary electric field source can be provided for directing the secondary electric field transverse, for example perpendicular, to the liquid-gas interface location 26. The secondary electric field source can include a direct current cathode 50 and anode 54. A DC power supply 58 can provide direct current through line 60 to the direct current anode 54 and through line 62 to the direct current cathode 50. A line 64 which can be wired or wireless can be provided to permit communication and control between the processor 46 and the DC power supply 58. Recirculation of the liquid and the gas phase is possible. A liquid recirculation inlet 70 and a recirculation outlet 74 can be provided. A pump 78 can be provided to recirculate liquid as necessary, which can be controlled by the processor 46 through a wired or wireless communications line 79.

A gas exit 80 from the vessel 14 is provided and a gas inlet 84 can also be provided. The gas outlet 80 can communicate with an exhaust conduit 90 through a valve or pump 88. When gas recirculation is desired, control of the valve 88 can direct recirculating gas through recirculating gas line 92 to the gas inlet 84. The gas inlet 84 can also be utilized to introduce new gas into the vessel 14.

Operation of the secondary electric field will cause electrons from the plasma 100 to be driven across the liquid-gas interface 26 into the liquid 18 as aqueous electrons 102. These aqueous electrons are highly reactive even towards liquid phase chemical species such as per- or poly-fluoroalkyl compounds.

Figure 2:
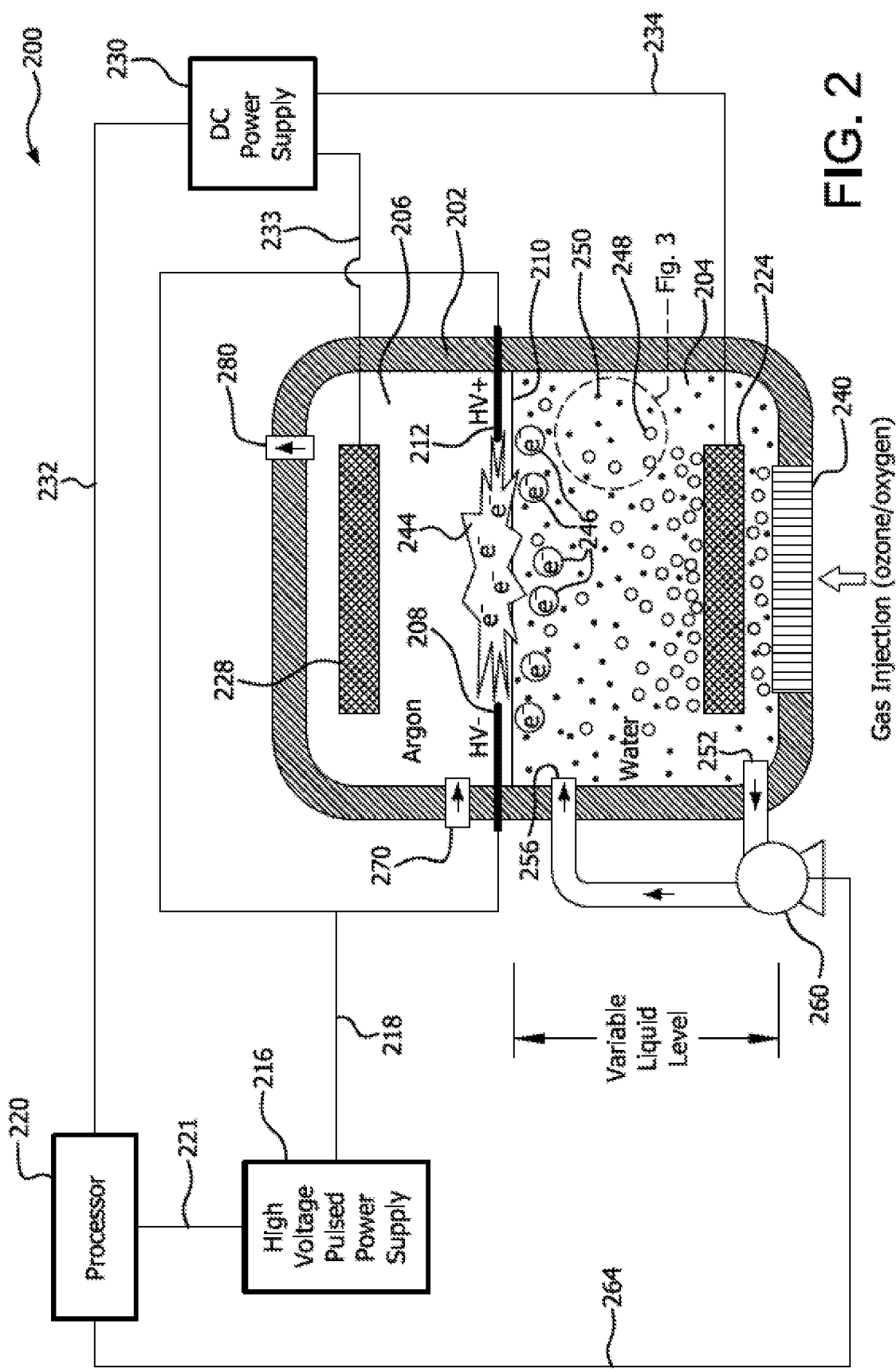
FIG. 2 is a schematic representation of an alternative embodiment of a reactor system for reacting liquid phase chemical species.

There is shown in FIG. 2 an alternative embodiment comprising a reactor system 200. The reactor system 200 includes a vessel 202 for containing a liquid phase 204 and a gas phase 206 defining a liquid-gas interface location 210. A pulsed discharge cathode 208 and anode 212 can be connected to a high voltage pulsed power supply 216 by line 218 so as to deliver a pulsed power input to the pulsed discharge cathode 208 and anode 212, thereby creating a plasma 244 comprising ions at the liquid-gas interface location. The high voltage power supply 216 can be connected to a processor 220 by a line 221 which can be wired or wireless, such that communication and control with the high voltage power supply 216 is enabled.

A secondary electric field source can be provided for directing a secondary electric field transverse to the liquid-gas interface. The secondary electric field source can include a direct current cathode 224 and anode 228, which can be connected to a direct current power supply 230 through a line 233 and a line 234. The secondary electric field will act to drive electrons across the liquid-gas interface 210 such that aqueous electrons 246 will accumulate in the liquid 204 near the liquid-gas interface 210. The DC power supply 230 can be connected to the processor 220 by a wired or wireless line 232 to provide communication and control. Gas can be introduced into the vessel 202 through a gas inlet 270 and can exit through the gas outlet 280. The liquid 204 can be recirculated through a liquid outlet 252 and a liquid inlet 256 with a pump 260. The pump 260 can be connected by a wired or wireless communications line 264 to the processor 220 to provide communication and control.

Figure 3:
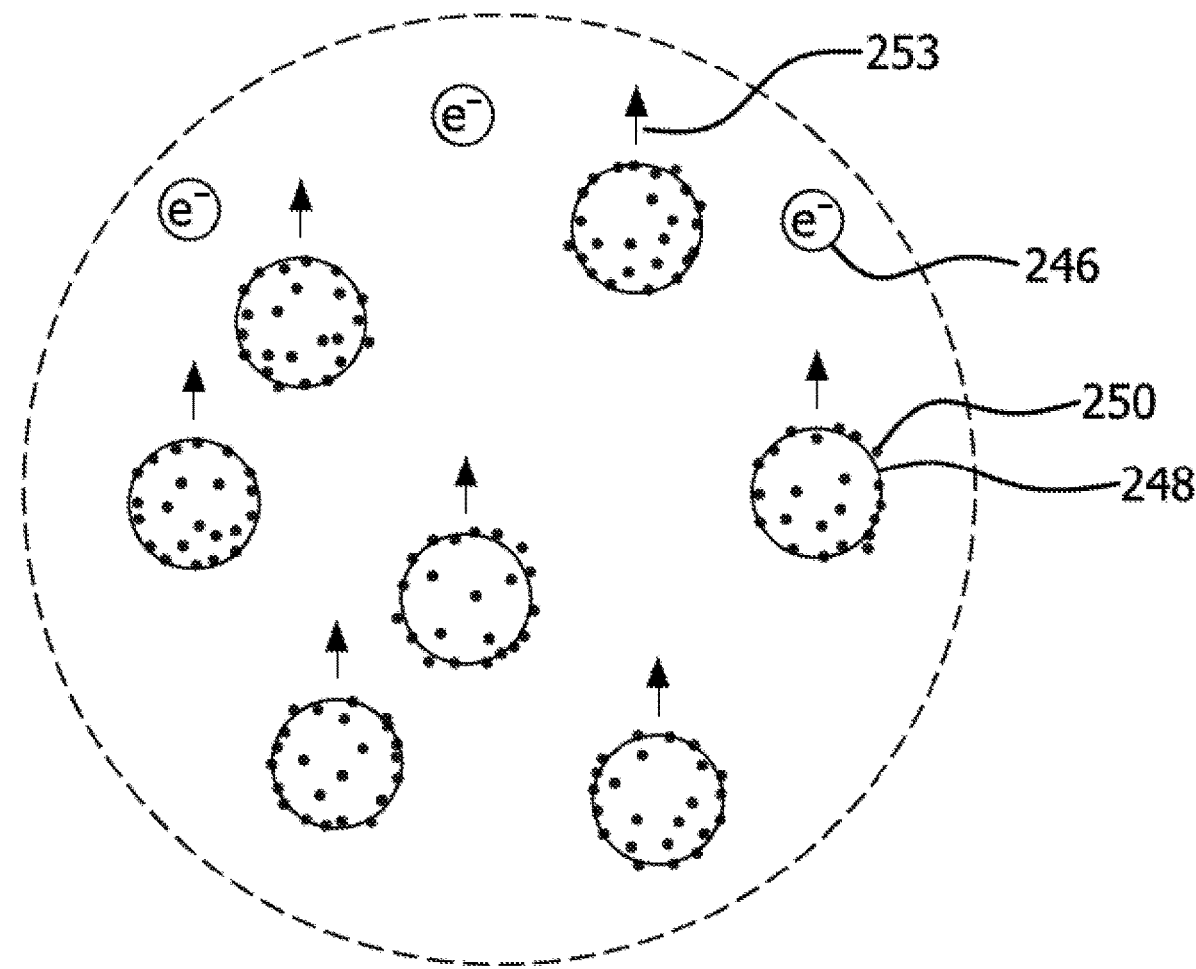
FIG. 3 is an enlargement of area FIG. 3 in FIG. 2.

Gas injection can also be performed through the gas inlet 240 that acts to distribute bubbles 248 in the liquid 204 which rise to the liquid-gas interface 210. As shown by the enlargement in FIG. 3, these bubbles 248 can accumulate contaminant 250 at the bubble-liquid interface and carry the contaminant 250 toward the plasma and the aqueous electrons 246 as the bubbles 248 rise in the direction shown by arrow 253. The gas can be comprised of a reactive compound such as ozone, which will react with the contaminant and thereby provide some contaminant removal in addition to that which derives from contact between the contaminant and the aqueous electrons 246 and plasma 244 at the liquid-gas interface 210. The direct current cathode 224 and anode 228 can be formed from a porous material or have through-holes to facilitate the passage of gas through the cathode 224 and anode 228.

Figure 4:
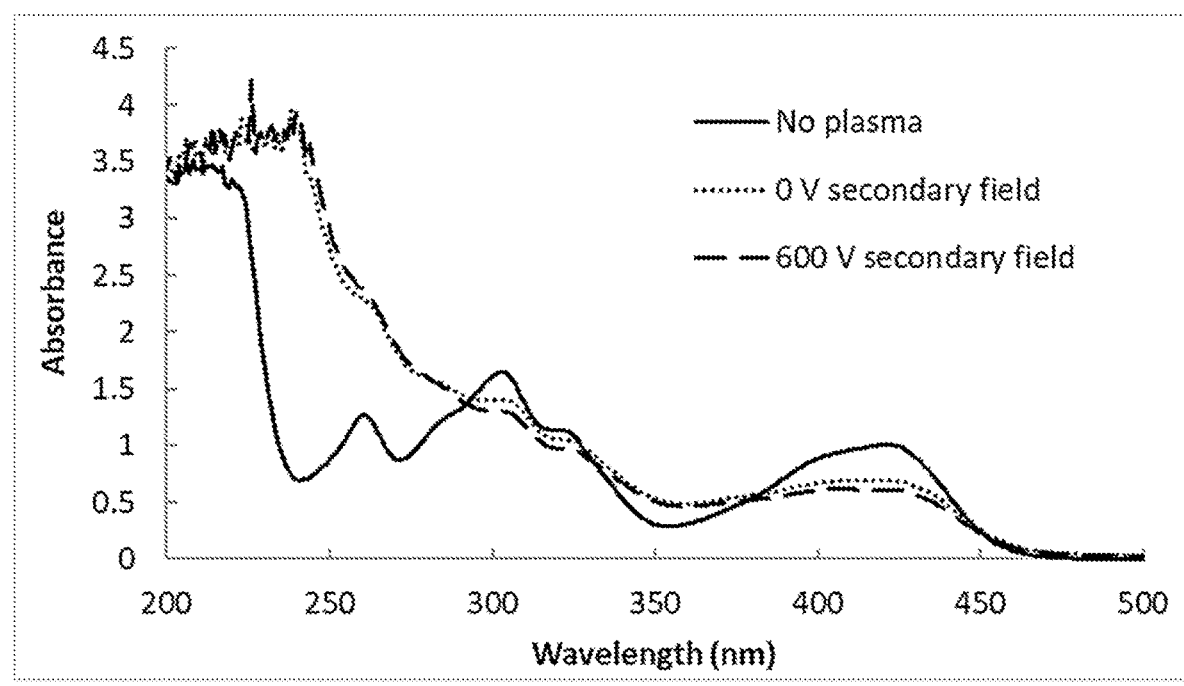
FIG. 4 is a plot of absorbance vs. wavelength (nm) for reactions with no plasma, 0 V secondary field, and 600 V secondary field.

To test the effect of the secondary electric field, ferrocyanide dye was utilized. Ferrocyanide is a water-soluble dye that is highly susceptible to reduction by electrons. 24 mL of a 1 mM dye solution was added to the reactor. Initial and final dye concentration was determined by UV-vis absorbance at 420 nm. In this configuration argon was used as the working gas, the primary pulsed electric field was delivered at 18 kV with a 100 ns pulse width and 3 kHz repetition frequency with a primary electrode gap distance of 0.2 cm. The secondary electrode gap distance was set to 3 cm and the applied voltage modulated to 0 and 600 Vdc. With no secondary electric field (0 Vdc) the dye concentration was reduced by 31% after 15 minutes of treatment. As shown in FIG. 4, when 600 Vdc was applied across the secondary electrodes the dye reduction increased to 39% with all other conditions held constant. This corresponds to a 25% increase in dye reduction when the secondary electric field was applied.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

The terminology used herein is for the purpose of describing particular aspects of the systems and methods described herein and is not intended to be limiting of the disclosure. As used herein, the singular forms "a", "an" and "the" are intended to include the plural forms as well, unless the context clearly indicates otherwise. Furthermore, to the extent that the terms "including", "includes", "having", "has", "with", or variants thereof are used in either the detailed description and/or the claims, such terms are intended to be inclusive in a manner similar to the term "comprising." Unless otherwise defined, all terms (including technical and scientific terms) used herein have the same meaning as commonly understood by one of ordinary skill in the art to which this invention belongs.

We claim:

1. A reactor system for reacting liquid phase chemical species in a liquid, comprising:
   a reactor vessel for containing the liquid phase and a gas phase, and having a liquid-gas interface location within the reactor vessel;
   a pulsed discharge cathode and anode for creating a pulsed discharge electric field at the liquid-gas interface location;
   a pulsed discharge power supply for delivering a pulsed power input to the pulsed discharge cathode and anode, and thereby creating a plasma comprising ions at the liquid-gas interface location;
   a secondary electric field source for directing a secondary electric field transverse to the liquid-gas interface;
   wherein the secondary electric field will drive some of the ions from the gas phase into the liquid phase to react with the liquid phase chemical species.

2. The reactor system of claim 1, wherein the ions are negative ions.

3. The reactor system of claim 2, wherein the negative ions are electrons.

4. The reactor system of claim 1, wherein the secondary electric field source comprises a direct current cathode and anode.

5. The reactor system of claim 4, wherein the direct current cathode and anode are within the reactor vessel.

6. The reactor system of claim 5, wherein the direct current cathode and anode are porous.

7. The reactor system of claim 1, wherein the secondary electric field is from 10 to 1000 V/cm.

8. The reactor system of claim 1, wherein the gas phase comprises at least one selected from the group consisting of nitrogen, oxygen, air, ozone, argon, and helium.

9. The reactor system of claim 1, wherein the at least one chemical species is a compound subject to chemical reduction.

10. The reactor system of claim 1, wherein the at least one chemical species is a fluorinated organic compound.

11. The reactor system of claim 10, wherein the fluorinated organic compound is a per- or poly-fluoroalkyl organic compound.

12. The reactor system of claim 1, wherein the pulsed discharge electric field is directed parallel to the liquid-gas interface.

13. The reactor system of claim 1, wherein the liquid phase comprises water.

14. The reactor system of claim 1, wherein the plasma discharge has a frequency of from 100 Hz to 1 MHz.

15. The reactor system of claim 1, further comprising a recirculation conduit and a recirculation pump for recirculating at least one selected from the group consisting of the liquid phase and the gas phase from the reactor vessel.

16. The reactor system of claim 1, wherein the secondary electric field is perpendicular to the liquid-gas interface location.

17. The reactor system of claim 1, wherein the pulsed discharge cathode and anode are within the reactor vessel.

18. The reactor system of claim 1, wherein the reactor vessel further comprises at least one selected from the group consisting of a gas injection port, a gas exit port, a liquid injection port, and a liquid exit port.

19. The reactor system of claim 18, wherein the gas injection port is configured to distribute gas bubbles into the liquid phase, wherein the bubbles will transport some of the liquid phase chemical species to the plasma at the liquid-gas interface location.

20. The reactor system of claim 19, further comprising an ozone source connected to the gas injection port, wherein ozone will react with the liquid phase chemical species as the liquid phase chemical species is transported to the liquid-gas interface.

* * * * *